US009242690B2

(12) United States Patent
Frazier

(10) Patent No.: US 9,242,690 B2
(45) Date of Patent: Jan. 26, 2016

(54) INTERCHANGEABLE COLORED BICYCLE

(71) Applicant: Kareem L Frazier, Douglassville, PA (US)

(72) Inventor: Kareem L Frazier, Douglassville, PA (US)

( * ) Notice: Subject to any disclaimer, the term of this patent is extended or adjusted under 35 U.S.C. 154(b) by 57 days.

(21) Appl. No.: 14/028,747

(22) Filed: Sep. 17, 2013

(65) Prior Publication Data

US 2015/0076788 A1   Mar. 19, 2015

(51) Int. Cl.
*B62K 3/02* (2006.01)
*B62K 19/02* (2006.01)

(52) U.S. Cl.
CPC .. *B62K 3/02* (2013.01); *B62K 19/02* (2013.01)

(58) Field of Classification Search
CPC .......... B62K 3/02; B62K 19/00; B62K 19/02; B62K 2700/00
USPC .................................. 280/274, 281.1, 288.3
See application file for complete search history.

(56) References Cited

U.S. PATENT DOCUMENTS

| | | | | |
|---|---|---|---|---|
| 2,353,063 A | * | 7/1944 | Otis | 40/406 |
| 3,499,238 A | * | 3/1970 | Publicker | 40/406 |
| 4,422,719 A | * | 12/1983 | Orcutt | 385/123 |
| 4,600,974 A | * | 7/1986 | Lew et al. | 362/102 |
| 4,901,209 A | * | 2/1990 | Nitz | 362/473 |
| 4,919,417 A | * | 4/1990 | Poulas | 482/82 |
| 4,956,754 A | * | 9/1990 | Chen | 362/101 |
| 5,075,992 A | * | 12/1991 | Kahn | 40/406 |
| 5,231,530 A | * | 7/1993 | Yen | 359/228 |
| 5,538,455 A | * | 7/1996 | James, II | 446/236 |
| 5,596,827 A | * | 1/1997 | Boulos | 40/406 |
| 5,966,769 A | * | 10/1999 | Tortorice | 15/105 |
| 6,241,359 B1 | * | 6/2001 | Lin | 362/96 |
| 6,336,736 B1 | * | 1/2002 | Edmond | 362/473 |
| 6,779,913 B2 | * | 8/2004 | Niezrecki et al. | 362/473 |
| 7,997,775 B2 | * | 8/2011 | Hurwitz | 362/474 |
| 8,740,433 B2 | * | 6/2014 | Smith | 362/555 |
| 2002/0088869 A1 | * | 7/2002 | Simmons | 239/17 |

FOREIGN PATENT DOCUMENTS

JP         05158420 A  *  6/1993  .............. G09F 21/04

* cited by examiner

*Primary Examiner* — Joseph Rocca
*Assistant Examiner* — Maurice Williams
(74) *Attorney, Agent, or Firm* — Stuart M. Goldstein

(57) ABSTRACT

An interchangeable colored bicycle has a bicycle framework with a main bicycle frame component part, a handlebar stem component part, and a wheel fork component part. Clear transparent tube members enclose and circumscribe these component parts. Free-flowing, colored liquids fill the interior spaces between the tube members and the component parts. The colored liquids in each interior space are different, thus allowing the bicycle to assume multiple colors. The free-flowing liquids can be drained from the tube members and different colored liquids can be poured into the interior spaces to change the colors of the bicycle.

16 Claims, 4 Drawing Sheets

INTERCHANGEABLE COLORED BICYCLE

BACKGROUND OF THE INVENTION

The color of a bicycle is usually important to the bicycle purchaser, especially to younger riders. However, if that color preference changes, the rider has no other option but to retain the bicycle with the less than favorable color, or purchase a new one with a different color. Further, selling a used bicycle would be easier if the bike could be available in a specific color, attractive to a potential buyer. A single bicycle which could be altered to a variety of different colors, changeable at the preference of the rider, would also be very desirable.

There is currently no means of simply and easily changing the color of a bicycle at the whim of the rider. There is also no means to permit a single bicycle to take on multiple colors, while still allowing the rider to continually change the colors.

SUMMARY OF THE INVENTION

It is thus the object of the present invention to provide the bicycle rider with the ability to change the color and hence the appearance of a bicycle.

It is another object of the present invention to provide a means by which the color of a bicycle can simply and effectively be changed, according to the preference of the rider.

It is still another object of the present invention to provide a bicycle which has component parts which can take on multiple different colors, according to the preference of the rider.

It is a further object of the present invention to provide a bicycle having component parts whose colors can be continuously changed, according to the preference of the rider.

These and other objects are accomplished by the present invention, an interchangeable colored bicycle having a bicycle framework comprising a main bicycle frame component part, a handlebar stem component part, and a wheel fork component part. Clear transparent tube members enclose and circumscribe these component parts. Free-flowing, colored liquids fill the interior spaces between the tube members and the component parts. The colored liquids in each interior space are different, thus allowing the bicycle to assume multiple colors. The free-flowing liquids can be drained from the tube members and different colored liquids can be poured into the interior spaces to change the colors of the bicycle.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
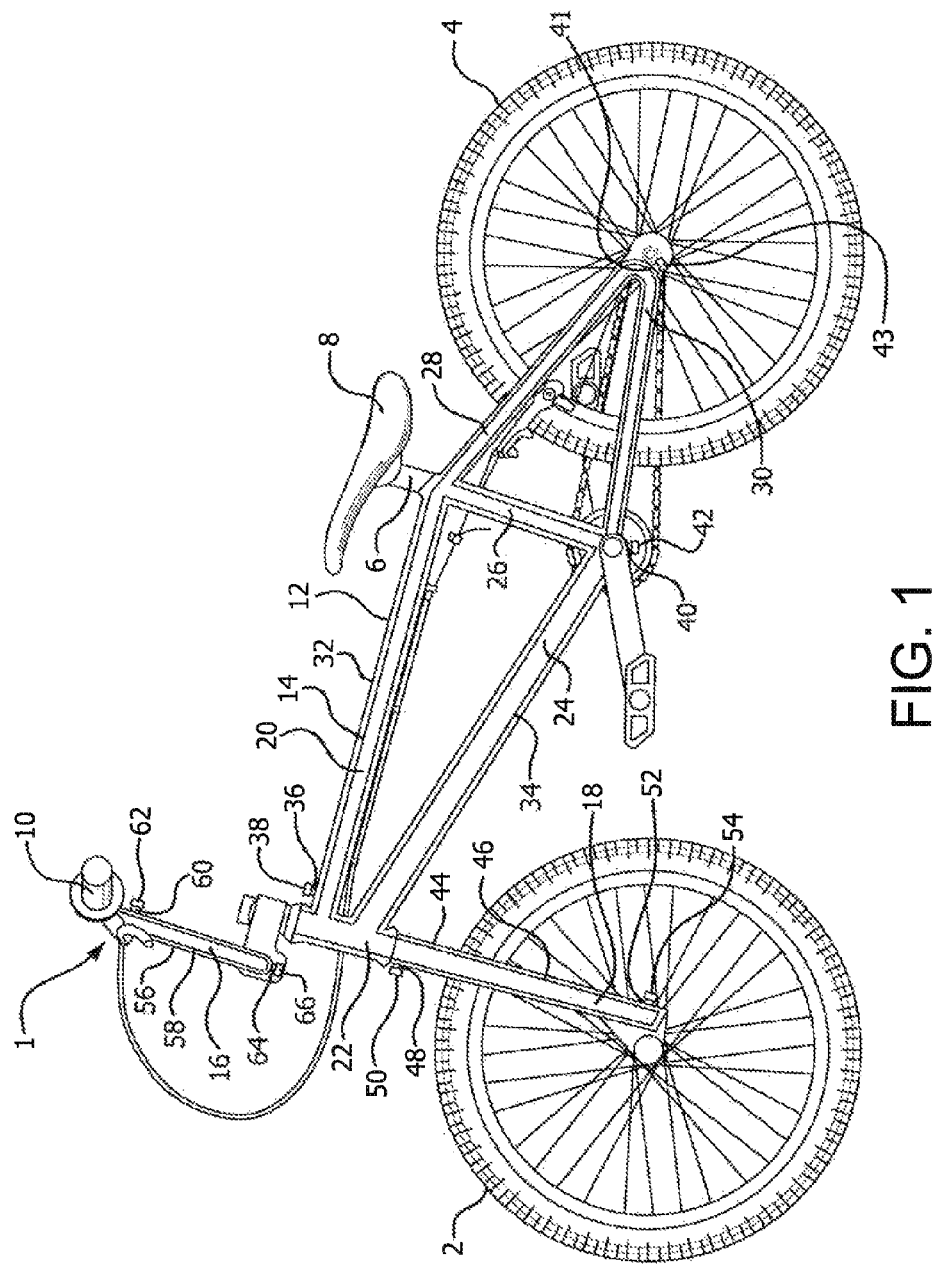
FIG. 1 is an elevation view of the interchangeable colored bicycle of the present invention.
Figure 4:
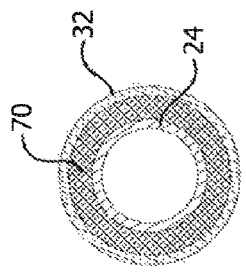
FIG. 4 is a cross-sectional view, taken from FIG. 2.
Figure 2:
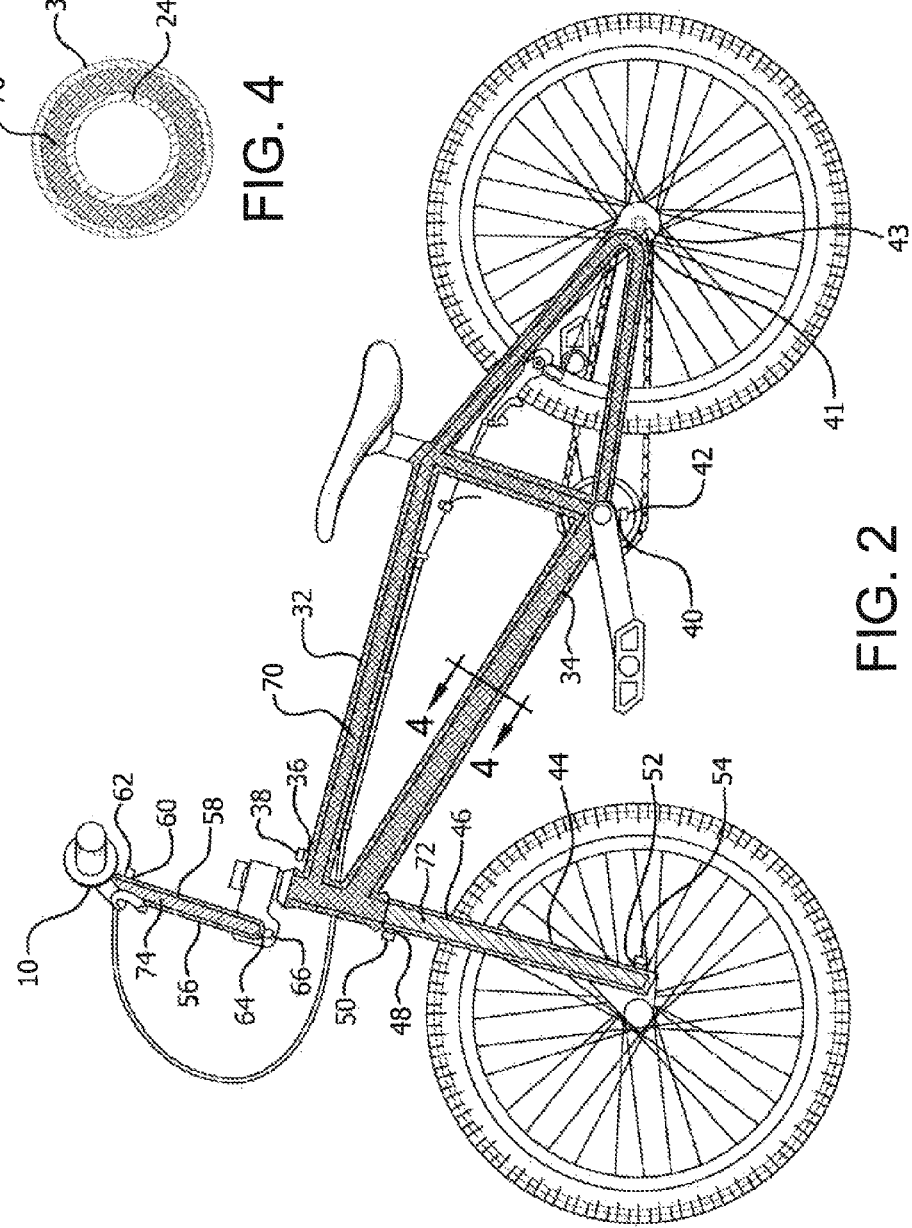
FIG. 2 is an elevation view of the interchangeable colored bicycle of the present invention filled with different colored liquid.
Figure 3:
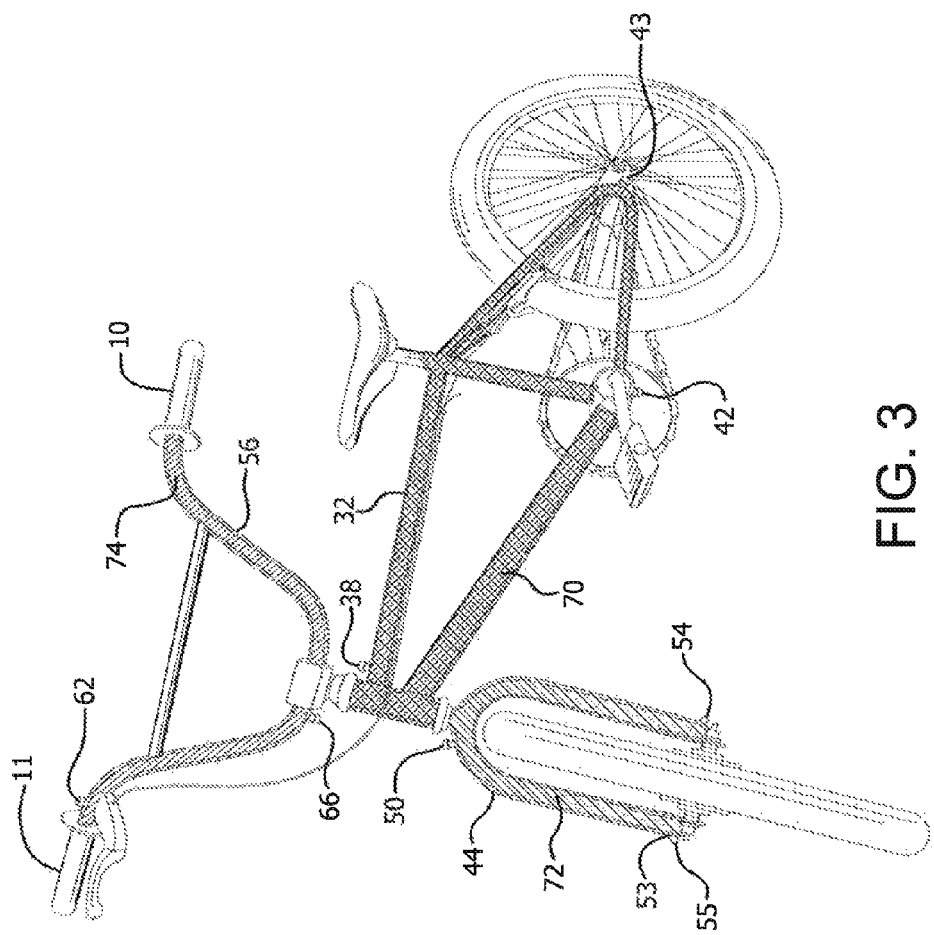
FIG. 3 is a perspective front view of the interchangeable colored bicycle of the present invention filled with different colored liquids.

Bicycle 1 comprises basic component parts, including front tire 2, rear tire 4, seat stem 6 with seat 8, and handlebar handles 10 and 11. Bicycle supporting framework 12 interconnects these component parts. For purposes of the herein invention, bicycle framework 12 comprises main bicycle frame 14 extending between rear tire 4 and the front of bicycle 1, handlebar stem 16 extending up from the main frame, and front wheel fork 18 supporting front tire 2 and extending down from the main frame. Main frame 14 comprises upper cross-bar 20, wheel fork support bar 22, lower cross-bar 24, seat stem support bar 26, upper rear wheel support bar 28 and lower wheel support bar 30.

Clear, transparent tube members or tubular means enclose and circumscribe bicycle framework 12, as described herein. First tube member 32 encloses and circumscribes all the component parts of main frame 14, i.e. cross-bars 20 and 24, wheel fork support bar 22, seat stem support bar 26, and rear wheel support bars 28 and 30. Interior space 34 is created between tube member 32 and the component parts of main frame 14.

First tube member 32 comprises inlet port 36 which opens into interior space 34. Port 36 is closed via closure cap 38. Tube member 32 also comprises discharge ports 40 and 41 which also open into interior space 34. Port 40 is closed via closure cap 42 and port 41 is closed via closure cap 43.

Second tube member 44, also clear and transparent, encloses and circumscribes front wheel fork 18 of supporting framework 12. Tube member 44 extends around, down, and up both fork members of wheel fork 18. Interior space 46 is thus provided between tube member 44 and wheel fork 18.

Tube member 44 comprises inlet port 48 which opens into interior space 46. Port 48 is closed via closure cap 50. Tube member 44 also comprises discharge ports 52 and 53 which also opens into interior space 46. Port 52 is closed via closure cap 54. Port 53 is closed via closure cap 55.

Third tube member 56, also clear and transparent, encloses and circumscribes handlebar stem 16 of supporting framework 12. Tube member 56 extends the full length of handlebar stem 16, between both handlebar handles 10 and 11. Interior space 58 is thus provided between tube member 56 and handlebar stem 16.

Tube member 56 comprises inlet port 60 which opens into interior space 58. Inlet port 60 is closed via closure cap 62. Tube member 56 also comprises discharge port 64 which also opens into interior space 58. Port 64 is closed via closure cap 66.

Tube members 32, 44, and 56, which constitute the tubular means of the invention, are fully enclosed as watertight containers around main frame 14, handlebar stem 16, and front wheel fork 18, respectively.

Bicycle 1 derives its unique, versatile color characteristics by means of different colored liquids, e.g. 70, 72, and 74, which could be water with color dye or equivalent colored fluid. Colored liquids 70, 72, and 74 are poured into inlet ports 36, 48, and 60, where they flow into interior spaces 34, 46, and 58 of their respective tube members 32, 44, and 56, thus filling the tube members. Once the tube members are filled, closure caps 38, 50, and 62 are secured over ports 36, 48, and 60, so that the colored liquids remain housed within the tube members. The result is that bicycle 1 takes on a unique, multi-colored appearance, with tube members 32, 44, and 56 all being different colors.

The color of bicycle 1 can be changed simply by removing closure caps 42, 43, 54, 55 and 66 from discharge ports 40, 41, 52, 53, and 64. This allows colored liquid 70, 72 and 74 to flow out of tube members 32, 44, and 56. The closure caps are then resecured on their respective discharge ports. Tube members 32, 44 and 56 can then be filled with liquids of different colors.

Bicycle frames are routinely fabricated using a variety of metals, e.g. steel, titanium, aluminum, etc. Many of these metals are subject to rusting or other types of deteriorating damage when subjected to liquids. An alternate design of the invention eliminates this potentially damaging situation.

Figure 5:
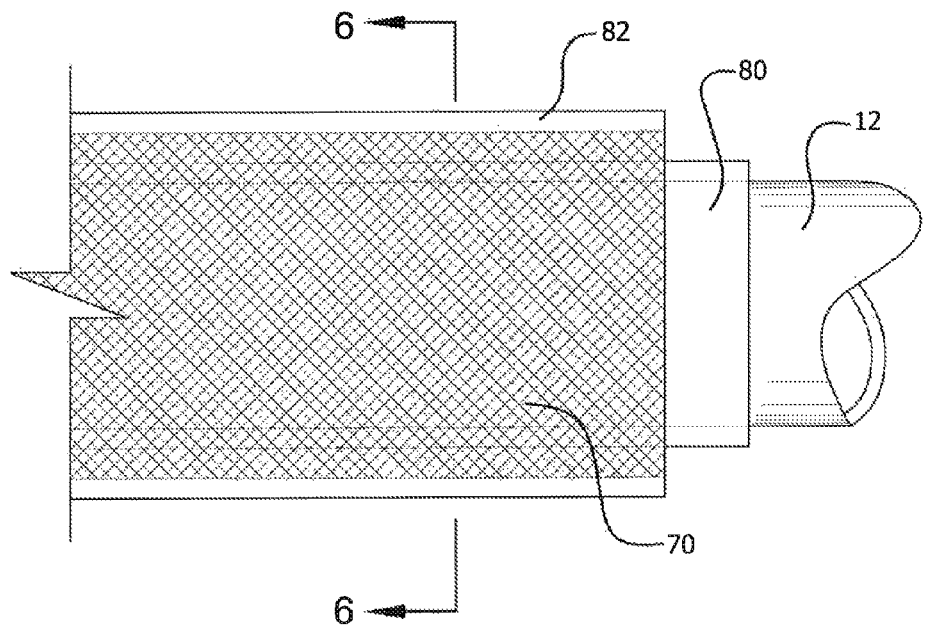
FIG. 5 is a partial elevation view of an alternate embodiment of the present invention.
Figure 6:
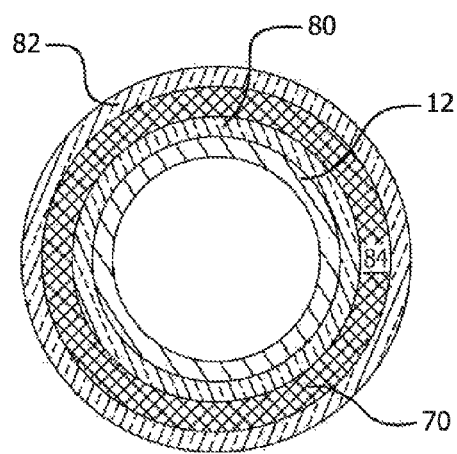
FIG. 6 is a cross-sectional view, taken from FIG. 5.

Thus, as shown in FIGS. 5 and 6, bicycle framework 12, which includes its bicycle frame components described above, is encased within a transparent tube member or inner sleeve 80 which contacts and circumscribes the bicycle framework. Outer tube member 82 circumscribes inner sleeve 80, in spaced relation to the inner sleeve. These components broadly represent tubular means of the invention. Interior space 84 is created between outer tube member 82 and inner sleeve 80. Space 84 is filled with colored liquid 70. In this manner, color liquid 70 does not contact the bicycle framework material, but instead remains isolated between inner sleeve 80 and outer tube 82.

It is contemplated that the bicycle framework components, i.e. main bicycle frame 14, handlebar stem 16, and wheel fork 18, will each be encased in an enclosed inner sleeve e.g. 80, circumscribing tube members 32, 44, and 56, which will then circumscribe the inner sleeves in spaced relation to the inner sleeves.

While the bicycle disclosed herein has been described with tube members enclosing and circumscribing specific component parts of bicycle framework 12, the invention is not to be considered so restricted. Any component part of the bicycle can be enclosed with a tube member and the use of a multitude of colored liquids, alone or in combination, is also contemplated.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. An interchangeable colored bicycle comprising:
a main bicycle frame extending between wheels of the bicycle;
a handlebar stem and a wheel fork extending from the main frame;
a first free flowing colored liquid comprising water with color dye; and
clear, transparent tubular means enclosing and circumscribing the main frame for housing the colored liquid, said tubular means having liquid intake means for filling the tubular means with said colored liquid and liquid discharge means for emptying the colored liquid from the tubular means, wherein the liquid intake means is disposed at a top of the main frame and the liquid discharge means is disposed at a bottom of the main frame, whereby when the tubular means is filled with the colored liquid, the main frame assumes the color of the colored liquid.

2. The interchangeable colored bicycle as in claim 1 further comprising a second free flowing colored liquid comprising water with color dye, said liquid having a different color than the first colored liquid, and second clear, transparent tubular means enclosing and circumscribing the handlebar stem for housing the second colored liquid, said second tubular means having liquid intake means for filling the second tubular means with the second colored liquid and liquid discharge means for emptying the second colored liquid from the second tubular means, whereby when the second tubular means is filled with the second colored liquid, the handlebar stem is the color of the second colored liquid.

3. The interchangeable colored bicycle as in claim 2 further comprising a third free flowing colored liquid comprising water with color dye, said liquid having a different color than the first and second colored liquid, and third clear, transparent tubular means enclosing and circumscribing the wheel fork for housing the third colored liquid, said third color means having liquid intake means for filling the third tubular means with the third colored liquid and liquid discharge means for emptying the third colored liquid from the third tubular means, whereby when the third tubular means is filled with the third colored liquid, the wheel fork is the same color as the third colored liquid.

4. The interchangeable colored bicycle as in claim 1 further comprising a second free flowing colored liquid comprising water with color dye, said liquid having a different color than the first colored liquid, and second clear, transparent tubular means enclosing and circumscribing the wheel fork for housing the second colored liquid, said second color means having liquid intake means for filling the second tubular means with the second colored liquid and liquid discharge means for emptying the second colored liquid from the second tubular means, whereby when the second tubular means is filled with the second colored liquid, the wheel fork is the same color as the second colored liquid.

5. An interchangeable colored bicycle comprising:
a main bicycle frame extending between the wheels of the bicycle;
a handlebar stem and wheel fork extending from the main frame;
a first free flowing colored liquid; and
clear, self-contained, enclosed first transparent tubular means encased around and circumscribing at least one of the main bicycle frame, the handlebar stem, and the wheel fork for receiving the colored liquid, said tubular means having liquid intake means for filling the tubular means with the colored liquid and liquid discharge means for emptying the colored liquid from the tubular means, wherein the liquid intake means is disposed at a top of the main frame and the liquid discharge means is disposed at a bottom of the main frame, or alternately, the liquid intake means is disposed at a top of the handle bar stem and the liquid discharge means is disposed at a bottom of the handle bar stem or the liquid intake means is disposed at a top of the wheel fork and the liquid discharge means is disposed at a bottom of the wheel fork, whereby when the tubular means is filled with the colored liquid the main frame, assumes the color of the colored liquid, and wherein the tubular means comprises at least two tube members, a first self-contained, enclosed tube member enclosed around and circumscribing the main bicycle frame, said tube member containing the first colored liquid, and a second self-contained, enclosed tube member enclosed around and circumscribing either the handlebar stem or the wheel fork, said second tube member containing a second free flowing colored liquid having a different color than the first colored liquid, said two tube members being independent of and segregated from each other, such that the first colored liquid is independent of the second colored liquid.

6. The interchangeable colored bicycle as in claim 5 further comprising inner sleeves, the tube members circumscribing the inner sleeves and being located in spaced relation to the inner sleeves, creating interior spaces between the tube members and the inner sleeves.

7. The interchangeable colored bicycle as in claim 5 wherein the liquid intake means comprises a first intake port through the first tube member, and a second intake port through the second tube member, and the liquid discharge means comprises a first discharge port through the first tube member, and a second discharge port through the second tube member.

8. An interchangeable colored bicycle comprising:
   a bicycle framework comprising a main bicycle frame, a handlebar stem, and a wheel fork;
   a first free flowing colored liquid comprising water with color dye;
   clear, transparent tubular means enclosing and circumscribing the bicycle framework, creating an interior space between the tubular means and the bicycle framework for housing the colored liquid, said tubular means having a liquid intake means for filling the interior space and the tubular means with said colored liquid, and liquid discharge means for emptying said colored liquid from the tubular means, wherein the liquid intake means is disposed at a top of the main frame and the liquid discharge means is disposed at a bottom of the main frame, whereby when the tubular means is filled with the colored liquid, the bicycle framework assumes the color of the colored liquid.

9. The interchangeable colored bicycle as in claim 8 in which the tubular means comprises at least one inner sleeve circumscribing and encasing the bicycle framework and an outer tube member circumscribing the at least one inner sleeve, creating an interior space between the at least one inner sleeve and the outer tube member, whereby when the interior space is filled with the colored liquid, the framework assumes the color of the colored liquid.

10. The interchangeable colored bicycle as in claim 8 wherein the tubular means further comprises at least two tube members, a first tube member enclosing and circumscribing the bicycle main frame for housing the first colored liquid, and a second tube member enclosing and circumscribing either the handlebar stem or the wheel fork for housing a second liquid, having a different color than the first colored liquid.

11. The interchangeable colored bicycle as in claim 10 wherein the tubular means further comprises at least two inner sleeves, the two tube members circumscribing and being located in spaced relation to the inner sleeves, creating interior spaces between the tube members and their inner sleeves.

12. The interchangeable colored bicycle as in claim 10 wherein the tubular means further comprises a third tube member enclosing and circumscribing either the handlebar stem or the wheel fork for housing a third free flowing colored liquid having a different color than the first and second colored liquids.

13. The interchangeable colored bicycle as in claim 12 wherein the tubular means comprises a third inner sleeve, the third tube member circumscribing and being located in spaced relation to the third inner sleeve, creating an interior space between the third tube member and the third inner sleeve.

14. The interchangeable colored bicycle as in claim 12 wherein the liquid intake means comprises a first intake port through the first tube member, a second intake port through the second tube member, and a third intake port through the third tube member, and the liquid discharge means comprises a first discharge port through the first tube member, a second discharge port through the second tube member and a third discharge port through the third tube member.

15. The interchangeable colored bicycle as in claim 10 wherein the liquid intake means comprises a first intake port through the first tube member and, a second intake port through the second tube member, and the liquid discharge means comprises a first discharge port through the first tube member and a second discharge port through the second tube member.

16. The interchangeable colored bicycle as in claim 8 wherein the liquid intake means comprises an intake port through the tubular means and wherein the liquid discharge means comprises a discharge port through the tubular means.

\* \* \* \* \*